No. 727,379. PATENTED MAY 5, 1903.
E. KEPP.
VEHICLE BRAKE.
APPLICATION FILED JAN. 26, 1903.
NO MODEL. 3 SHEETS—SHEET 1.

WITNESSES:

INVENTOR
Ezra Kepp
BY
ATTORNEYS.

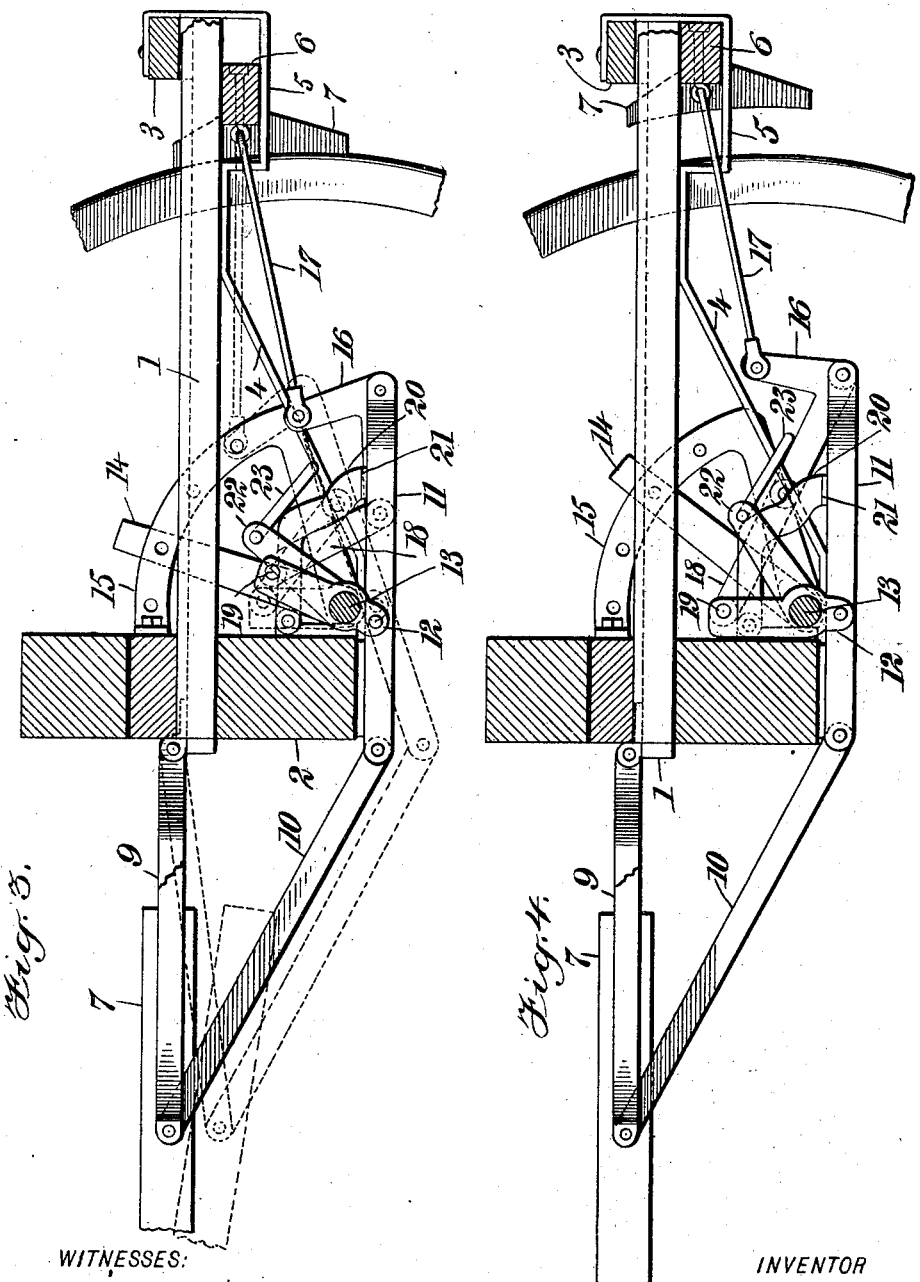

No. 727,379. PATENTED MAY 5, 1903.
E. KEPP.
VEHICLE BRAKE.
APPLICATION FILED JAN. 26, 1903.
NO MODEL. 3 SHEETS—SHEET 3.

WITNESSES:

INVENTOR
Ezra Kepp
BY
ATTORNEYS.

No. 727,379. Patented May 5, 1903.

UNITED STATES PATENT OFFICE.

EZRA KEPP, OF XENIA, ILLINOIS.

VEHICLE-BRAKE.

SPECIFICATION forming part of Letters Patent No. 727,379, dated May 5, 1903.

Application filed January 26, 1903. Serial No. 140,529. (No model.)

*To all whom it may concern:*

Be it known that I, EZRA KEPP, a citizen of the United States, and a resident of Xenia, in the county of Clay and State of Illinois, have invented a new and Improved Vehicle-Brake, of which the following is a full, clear, and exact description.

This invention relates to improvements in brakes for road-wagons or similar vehicles, the object being to provide a brake mechanism so arranged that it may be set to apply the brake by a team holding back on the vehicle-tongue, to apply the brake by either pulling or back pressure on the tongue, to apply the brake by pulling strain alone, and to so place the parts that the brake cannot be set by either forward or back strain on the tongue.

I will describe a vehicle-brake embodying my invention and then point out the novel features in the appended claims.

Reference is to be had to the accompanying drawings, forming a part of this specification, in which similar characters of reference indicate corresponding parts in all the figures.

Figure 1:
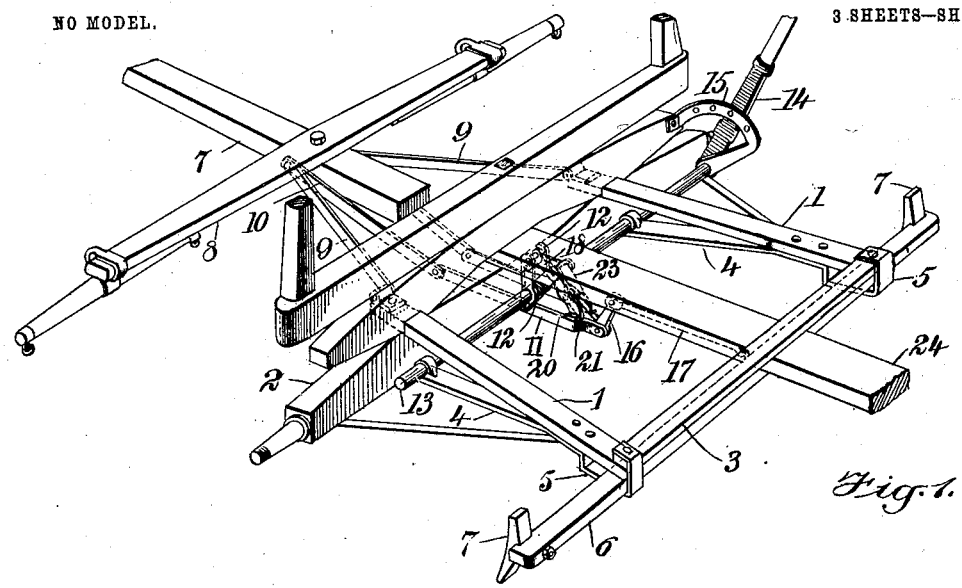

Figure 1 is a perspective view of a vehicle-brake mechanism embodying my invention. Figs. 2, 3, 4, and 5 are sectional views thereof, showing the parts in different positions; and Fig. 6 is a plan view thereof.

The brake-mechanism frame comprises the side rails 1, which are attached to the front axle 2 and extend rearward therefrom. These portions 1 take the place of the ordinary hounds. The rear ends of the side rails 1 are connected by a cross-bar 3, and from these rear ends brace-straps 4 extend to a connection with the lower side of the axle. These brace-straps 4 are provided with slideways 5 for the brake-beam 6, having shoes 7 on its ends for engaging with the rear faces of the front wheels of a vehicle. The tongue or pole 7, on which the whiffletree 8 is mounted, has swinging connection with the side rails 1 through the medium of links 9, and from the pivotal connection between said links 9 and the tongue links 10 extend downward to pivotally connect with draw-rods 11. These draw-rods are pivotally connected between their ends to blocks 12, mounted to swing on a rock-shaft 13, extended along the rear side of the axle and provided at one end with an operating-lever 14, designed to engage a pin carried by the lever in any one of a series of holes formed in the segment 15. There are four of these holes shown, so that the lever and the operating mechanism can be changed to perform four different services, as will hereinafter appear. The rear ends of the draw-bars 11 are curved toward each other, and pivoted between these ends is a bell-crank lever 16, from the vertically-disposed member of which a rod 17 extends to a connection with the brake-beam. The other member of this bell-crank lever has a link connection 18 with a rod 19, connecting the upper ends of the swinging blocks 12. Curved or cam-shaped arms 20 have pivotal connection with studs on the rear side of the axle, and the lower ends of these arms are provided with outward projections or foot-plates 21 for engaging on the upper sides of the draw-bars 11. Rigidly attached to the rock-shaft 13 are arms 22, which stand at a slight rearward angle relatively to the operating-lever 14, and mounted to swing between these arms at the rear end is a plate 23, which forms a stop, as will hereinafter appear. The connecting-rod of the arms 22 is designed to slide on the cam-shaped arms 20.

Figure 2:
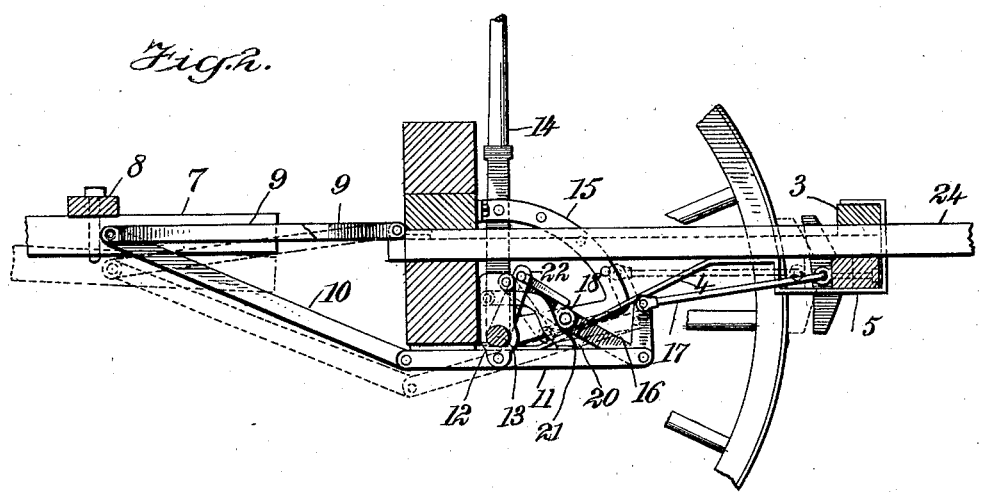

Fig. 2 shows the first position of the mechanism, which permits the applying of the brake when back pressure is exerted on the tongue or pole, but prevents the setting of the brake by a forward pull on the pole. It will be noted that the pin of the lever 14 is engaged in the outermost or first hole in the segment 15. By back pressure or by tilting the rear end of the tongue downward the rods 11 will be rocked on their pivotal connections with the blocks 12, breaking the joint between the link 18 and the bell-crank lever and forcing the brake-shoes into engagement with the wheels, as indicated by dotted lines in said Fig. 2.

In Fig. 3 the operating-lever is moved to the second hole of the series in the segment. When the parts are in position, the frame may be set by back pressure on the tongue or by drawing forward. This obviously will be found of great service in going downhill. By back pressure the action will be substantially the same as above described in connection with Fig. 2; but in drawing ahead the draw-bars 11 will be drawn slightly forward, rocking the blocks 12, so that the rod 19 will press downward on the link 18, causing the swinging movement of the bell-crank lever to set the brake.

In the third position (indicated in Fig. 4) the device is adjusted for setting the brake on the forward pull only. It will be seen that by back pressure on the tongue the draw rods or bars 11 will be prevented from swinging upward at their rear ends by the ends of the cam-arms 11 engaging therewith and held down by the rod connecting the arms 22. Upon the forward pull, however, the said rods 11 will be drawn forward, rocking the blocks 12, which by bearing on the links 18 will swing the bell-crank lever and operate the brake.

Figure 5:
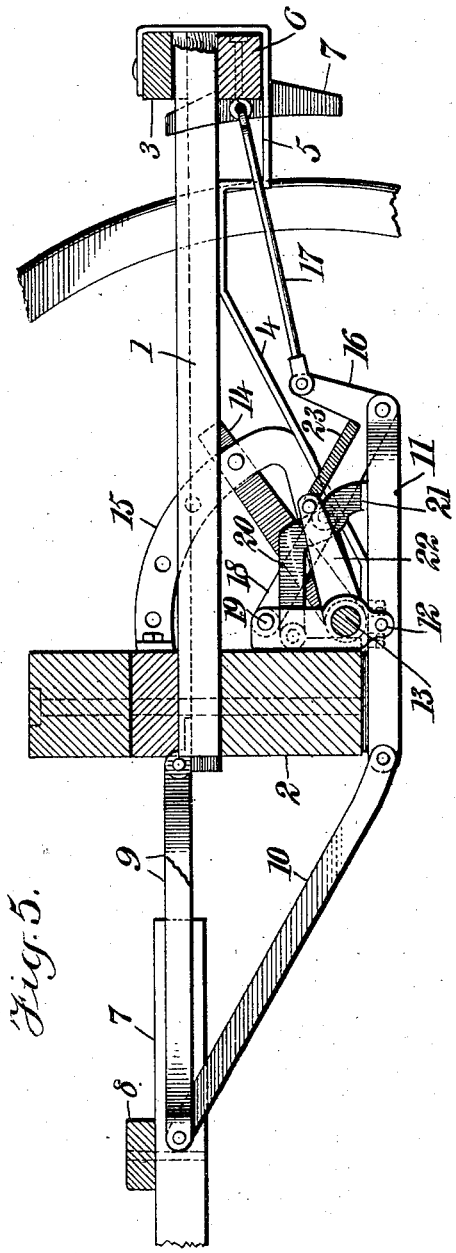
Figure 6:
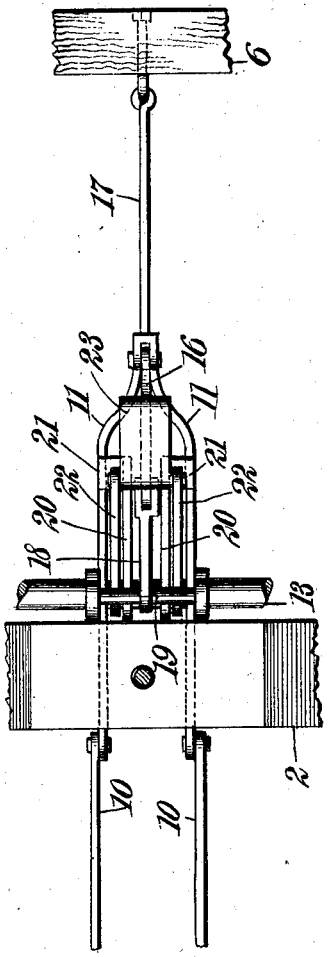

In Fig. 5, which shows the fourth position, designed to prevent the setting of the brake by either pulling or a back movement, it will be seen in said Fig. 5 that the plate 23 is moved into connection with the upwardly-disposed member of the bell-crank lever. Therefore the said bell-crank lever cannot be rocked on its pivot. The usual reach 24 is used in connection with the vehicle, and the turning mechanism for the front axle may be of the usual construction.

The brake embodying my invention may be readily applied to a wagon, and it will add but very little extra weight to the same.

Having thus described my invention, I claim as new and desire to secure by Letters Patent—

1. A vehicle-brake mechanism comprising a brake-shoe-carrying beam, a rock-shaft, a tongue, draw-bars having link connection with the tongue, link connections between the vehicle and tongue, blocks mounted to swing on the rock-shaft and having pivotal connection with the draw-bars, a bell-crank lever carried by said draw-bars and having connection with the brake-beam and with said blocks, and curved arms coacting with said blocks.

2. In a vehicle-brake, the combination with a swinging tongue and the brake on the vehicle, of connecting mechanism between the tongue and brake, and means for adjusting said mechanism, whereby the brake may be set by a pulling strain on the tongue, may be set by either a pulling or back strain while the mechanism remains at one adjustment, or may be set by a pulling strain alone, and the said means also operating to adjust the mechanism whereby the brake is rendered inoperative by either pulling or back strain.

3. The combination with a vehicle, of a brake-shoe-carrying beam, a rock-shaft at the rear of the front axle, blocks mounted to swing on said rock-shaft, draw-bars having swinging connection with the lower ends of said blocks, a rod connection between the upper ends of said blocks, curved arms having swinging connection with the axle, and adapted for engagement with said draw-rods and also adapted to be engaged by said bar connecting the arms on the rock-shaft, a bell-crank lever pivoted to the draw-rods, a connection between said bell-crank lever and the brake-beam, a link connection between said bell-crank lever and the rod connecting said blocks, arms extended rigidly from the rock-shaft, a plate having swinging connection with said arms, an adjusting-lever on the outer end of said rock-shaft, a tongue, a swinging connection between said tongue and said draw-bars, and a swinging connection between said tongue and the vehicle.

4. A vehicle-brake mechanism, comprising a frame having side bars extended rearward from the front axle of the vehicle, a brake-beam mounted to slide lengthwise of said side bars, a rock-shaft at the rear side of the front axle, blocks mounted to swing on said rock-shaft, draw-rods having pivotal connection with the lower ends of said blocks, a bell-crank lever having swinging connection with the rear ends of said draw-bars, a link connection between said bell-crank lever and said blocks, arms extended rigidly from said rock-shaft and carrying a part for engaging with said bell-crank lever, a tongue, a link connection between said tongue and said side bars of the frame, and a link connection between said tongue and said draw-bars.

In testimony whereof I have signed my name to this specification in the presence of two subscribing witnesses.

EZRA KEPP.

Witnesses:
 ASHER R. COX,
 GEO. W. COX.